United States Patent [19]
Das et al.

[11] Patent Number: 6,092,378
[45] Date of Patent: *Jul. 25, 2000

[54] VAPOR LINE PRESSURE CONTROL

[75] Inventors: Sathish R. Das, Indianapolis; Don A. Schuster, Martinsville; Larry J. Burkhart, Indianapolis; Ronald G. Butcher, Greenwood; Timothy J. Perry, Zionsville, all of Ind.

[73] Assignee: Carrier Corporation, Syracuse, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/995,624

[22] Filed: Dec. 22, 1997

[51] Int. Cl.$^7$ ............................. F25D 17/04; F25B 1/00
[52] U.S. Cl. ...................... 62/186; 62/498; 62/DIG. 17
[58] Field of Search ..................... 62/DIG. 17, 228.3, 62/186, 498

[56] References Cited

U.S. PATENT DOCUMENTS

| | | | |
|---|---|---|---|
| 2,252,300 | 8/1941 | McGrath | 62/DIG. 17 |
| 5,782,101 | 7/1998 | Dennis | 62/DIG. 17 |

*Primary Examiner*—William Wayner

[57] ABSTRACT

In a heat pump system designed for use with a relatively low pressure refrigerant, provision is made, by use of a vapor pressure control system, to use a higher pressure refrigerant without replacement of the indoor coil and the line set. The vapor pressure is sensed during periods of heat pump operation, and when the pressure reaches a predetermined maximum threshold level, the outdoor fan speed is reduced to thereby cause the vapor pressure to be reduced. When the vapor pressure is reduced to a predetermined minimum threshold level, then the fan speed is resumed so as thereby allow the vapor pressure to again be increased.

13 Claims, 2 Drawing Sheets

VAPOR LINE PRESSURE CONTROL

BACKGROUND OF THE INVENTION

This invention relates generally to heat pump systems and, more particularly, to a method and apparatus for controlling the pressure within the interconnecting tubing and other refrigerant containing components thereof so as to prevent the exceeding of the maximum design pressure when using a high pressure refrigerant.

The refrigerant which has been commonly used in conventional residential and commercial air conditioners and heat pumps has been R-22, an HCFC refrigerant. However, because of the recent concern about environmental effects, the CFC and HCFC refrigerants are being phased out. Non-chlorinated refrigerants that are being developed as replacements in the residential and light commercial systems, tend to be of higher pressure than the R-22. One of the more promising replacement refrigerants is HFC R-410A, with operating pressures up to 70% higher than R-22.

Use of higher pressure refrigerants has the greatest impact on the high pressure side of a system. Accordingly, for an air conditioner, the outdoor unit needs to be substantially changed in design in order to accommodate these higher pressures. That is, to meet safety agencies and organization requirements, most refrigerant containing components on the high pressure side of the system must be designed to withstand the significantly higher pressures. The low pressure side components, on the other hand, may be used with minor modifications and/or precautions. The costs associated with these changes of both the outdoor and indoor sections to accommodate an R-410A refrigerant is not significantly more than that for replacing an R-22 air conditioner with a new R-22 air conditioner and is therefore economically feasible. This is not necessarily so in the case of a heat pump.

To accommodate an R-410A heat pump operating in the cooling mode, the outdoor section must be redesigned to accommodate the higher pressures as discussed hereinabove. In addition, to accommodate the heating mode of operation, wherein the high pressure section is in the indoor coil, the indoor refrigerant containing components, as well as other components in the outdoor unit, must be redesigned.

In addition to the outdoor and indoor coils, there is a portion of the system known as the "line set". This is the interconnecting tubing which connects the indoor and outdoor sections of air conditioners and heat pumps. Typically, R-22 air conditioners and heat pumps have used what is referred to as RST (Refrigerant Service Tube) refrigeration copper tubing for line sets. The physical dimensions of RST tubing is not regulated or recognized by any safety organization or national standards but is simply the general air conditioning and refrigerant industry accepted tubing.

The line set is typically considered field fabricated and is generally regulated by local building codes. Most local and national codes for refrigerant piping reference the ASME standard, ASME B31.5 "Refrigeration Piping". For R-410A air conditioners and R-410 A heat pumps operating in the cooling mode, the standard RST tubing meets the requirements set forth in the ASME B31.5. However, with heat pumps, the conventional R-22 construction of the line set vapor line typically does not meet the requirement of the ASME B31.5 standards. That is, the standard RST vapor tube installed in a heat pump will have a rated working pressure below that of the ASME B31.5 standard when using R-410 A as a refrigerant.

One approach to accommodating the R-410A refrigerant is to change the line sets or at least the vapor line. However, this causes disproportionate costs to be incurred. First of all, the line sets of existing systems are often located in the walls between the outdoor and indoor systems and cannot be easily accessed. Secondly, aside from the labor costs, the costs of copper tubing is expensive because (a) thicker walls require more copper and (b) the low volume of thicker walled copper tubes drives the costs up disproportionately. For these reasons, the required changes that need to be made to an R-22 heat pump to accommodate the use of R-410A are significantly higher than the costs to replace the R-22 with a new R-22 system and is therefore not economically feasible.

It is therefore an object of the present invention to provide an improved method and apparatus for accommodating the use of a higher pressure refrigerant in a system designed for use of a lower pressure refrigerant.

Another object of the present invention is the provision for not exceeding the maximum design pressure when using high pressure refrigerant in a heat pump system.

Yet another object of the invention is the provision for converting a low pressure refrigerant system to a high pressure refrigerant system in an economical and effective manner.

These objects and other features and advantages become readily apparent upon reference to the following description when taken in conjunction with the appended drawings.

SUMMARY OF THE INVENTION

Briefly, and in accordance with one aspect of the invention, the line set and indoor coil used for a lower pressure refrigerant are retained for use in a system using a higher pressure refrigerant. In order to prevent the exceeding of the maximum design pressure of the lines during higher pressure operation, such as when the system is operating in the heat pump mode, the pressure is maintained at a level below a threshold limit of the maximum design pressure.

By another aspect of the invention, the vapor pressure in the outdoor unit of a heat pump is sensed, and the outdoor fan is responsively operated in such a manner as to maintain the pressure in the vapor line below an established threshold level.

In accordance with another aspect of the invention, when the vapor pressure in the outdoor section of a heat pump reaches a predetermined threshold level, the outdoor fan speed is reduced, thereby causing the refrigerant pressure on the high side of the system to decrease. When the vapor pressure is reduced to a predetermined lower threshold level, then the original fan speed is resumed to allow the pressure to increase in the system.

By yet other aspects of invention, the cycling of the outdoor fan can be accomplished by the cycling on and off of a single speed fan motor in response to the pressure switch, or by simply decreasing and increasing the speed of a two-speed or variable speed motor in response to the pressure switch.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
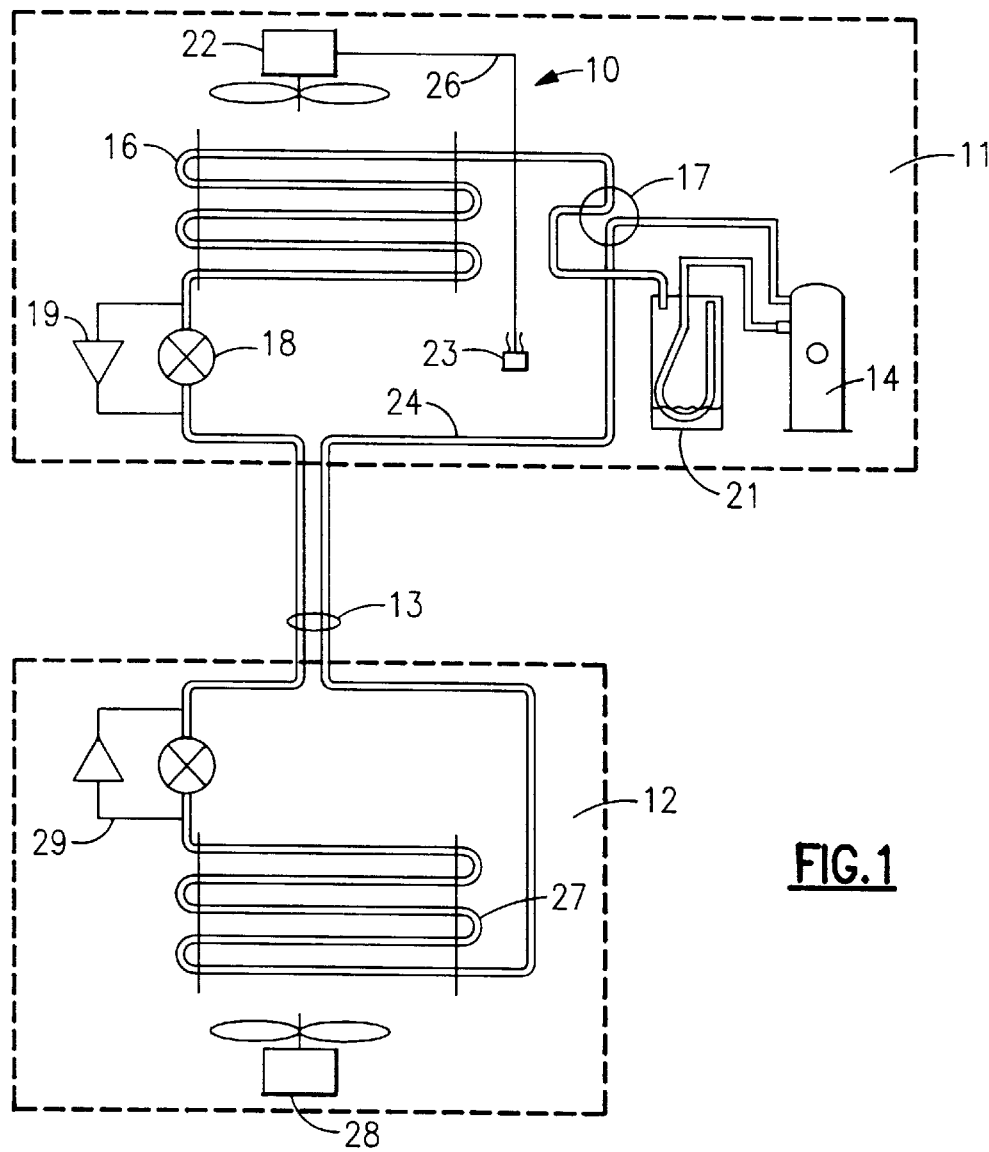
FIG. 1 is a schematic illustration of a heat pump with the present invention incorporated therein.

Referring now to FIG. 1, the invention is shown generally at 10 as applied to a conventional heat pump system having an outdoor unit 11 and an indoor unit 12 interconnected by tubing commonly referred to as a line set 13.

The outdoor unit 11 includes a compressor 14 and a heat exchanger coil 16 which operate in a conventional manner in cooperation with the indoor unit 12 to bring about a complete refrigeration cycle while operating in either the heating or cooling mode. That is, the outdoor coil 16 acts as a condenser coil when the system is operating in the cooling mode and as an evaporator during periods when the system is operating in the heating mode. A four way valve 17 is included in the outdoor section 11 to switch between the heating and cooling modes in a conventional manner. Also, an expansion device 18 is provided for use during heat pump modes of operation, with a bypass line 19 acting to bypass the expansion device 18 during periods of air conditioning modes of operation. An accumulator 21 is provided at the evaporator outlet to prevent liquid refrigerant from returning to the compressor 14. An outdoor fan 22 is provided to circulate outdoor air over the outdoor coil 16 in a conventional manner, except as modified by the present invention.

In accordance with the present invention, a vapor pressure control 23 is connected to refrigerant line 24 so as to cycle the outdoor fan 22 in response to the pressure in the refrigerant line 24 in a manner to be more fully described hereinafter. The vapor pressure control 23 is electrically connected to the motor of the fan 22 by way of electrical line 26.

Referring now to the indoor unit 12, there is included an indoor heat exchanger coil 27 and an indoor fan 28 for circulating indoor air thereover. An expansion device 29, with a bypass portion, is included to accommodate the cooling and heating modes in a conventional manner.

Considering now the changes that must be made to such a system designed for use with a relatively low pressure refrigerant such as R-22 when that refrigerant is replaced with a relatively high pressure refrigerant such as R-410A, it is desirable to make changes in various components of both the outdoor unit 11 and the indoor unit 12. For example, since the pressures in the outdoor unit can reach 600 Psig while operating in the cooling mode, the entire outdoor unit is replaced. In the indoor unit, however, only the expansion device needs to be replaced, so the indoor coil can be retained.

Although the above changes can be made in a generally economically feasible manner, there are other changes which, though they may be desirable, are not economically feasible. That is, since during heat pump modes of operation, the high pressure side would normally operate at relatively high pressures that could exceed the maximum design pressure of the interconnecting tubing, it would be desirable to have thicker walled tubing in both the high pressure side of the line set and in the indoor coil 27. However, it would be expensive to replace the entire indoor coil 27, and to replace the line set may be either moderately expensive or, if building structural changes are required, prohibitively expensive. The present invention is therefore provided to accommodate the need in a reliable and economical manner.

The principal of operation of the present invention is to reduce the speed of the outdoor fan motor 22 when the vapor line refrigerant pressure of the heat pump system operating in the heating mode reaches the design pressure of the line set or the indoor coil. This in turn causes the refrigerant pressure on the high side of the system to be reduced. When the reduction of the refrigerant pressure in the vapor line reaches a predetermined cut in pressure, the original fan motor speed is resumed. The pressure at which the fan motor speed is reduced is set by the lowest design pressure for the specific combination of vapor line and indoor coil. The cut in pressure is driven by the differential of economically feasible switches.

A reduction in the fan motor speed may be accomplished in any of a number of ways. For example, a two-speed motor can be used wherein the high speed is used during normal operation and the low speed is used during periods in which the cut-out pressure has been reached. A typical motor which could be used for this purpose is an induction type motor with single or multiple speeds which is commercially available from motor manufacturers such as General Electric, A. O. Smith, or Emerson.

Another alternative is to use a variable speed motor for the outdoor fan. Because of the higher costs for the purchase of such a motor, it would not be economically feasible to use it for this purpose only. However, if there were other reasons to have a variable speed motor to drive the outdoor fan, such as a possible savings in long term operating costs, then a variable speed motor would be practical for this use. In such case, the motor would be operated at higher speeds for normal operation and would then be operated at lower speeds or stopped at times when the pressure cut-out limit has been reached.

For purposes of simplicity, the present invention will be described in terms of use with a single speed motor which is operated in either the on or off condition. That is, it will be turned on during periods of normal operation and will be turned off when the cut out pressure has been reached as sensed by the vapor pressure control. An example of such a motor that could be used for this purpose is General Electric Part Number KCP39FGN809BS.

Figure 2:
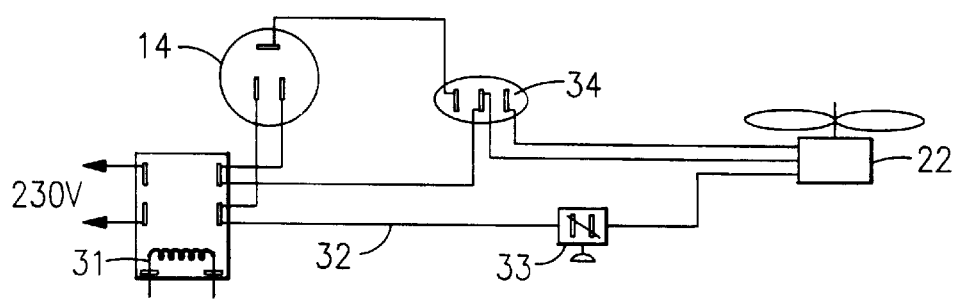
FIG. 2 is an electrical circuit and diagram of the fan cycling portion of the invention.

Referring now to FIG. 2, the electrical circuitry portion of the present invention is shown as interconnected with the compressor 14 and the outdoor fan 22. The compressor 14 is connected to a high voltage power source by way of a contactor 31 which is controlled to turn the compressor on and off in accordance with normal operating control functions. Connected in parallel with the compressor, so as to also be powered through the contactor, is a fan power circuit 32 which includes a vapor pressure switch 33, the fan motor 22 and the compressor capacitor 34. The vapor pressure switch 33 is a single pole, single throw, normally closed pressure switch which is activated by a pressure diaphragm connected in the vapor line 24 inside the heat pump outdoor unit. Thus, when the pressure in the vapor line exceeds a cut-out pressure of the pressure switch, it opens the electrical contacts and the outdoor fan 22 is turned off. Without the air flow across the outdoor coil (the evaporator during heating mode of operation), the saturated suction pressure of the evaporator drops and so also does the pressure and specific volume of the refrigerant entering the compressor. This in turn reduces volumetric efficiency of the compressor and the refrigerant discharge pressure. This pressure decrease will continue until the cut in pressure of the vapor pressure switch 33 is reached, at which time vapor pressure switch 33 will close and power will be resumed to the outdoor fan 22.

Referring now to the following Table I, the RST copper tube dimensions for various sized heat pump systems are shown, along with the corresponding ASME maximum working pressures. In this regard, it should be understood that this working pressure is established with a substantial margin of safety applied. For example, a typical R-22 indoor coil design with an actual burst pressure of 2100 Psig would have a working pressure limit of 420 Psig (i.e. with a safety factor of 5). Thus, the ASME maximum working pressures listed in Table I are also calculated with a similar safety margin.

TABLE 1

| System Tube Capacity | Tube Outside Thickness | Tube Thick-ness | ASME Max. Working Pressure | Pressure Switch (Psig) | |
|---|---|---|---|---|---|
| (ton) | (in.) | | (Psig) | Cut-In | Cut-Out |
| 2 | 5/8 | .0030 | 472 | 325 | 400 |
| 2.5–3 | 3/4 | .0035 | 384 | 309 | 384 |
| 3.5–4 | 7/8 | .0040 | 430 | 325 | 400 |
| 4–5 | 1-1/8 | .0040 | 374 | 299 | 374 |

Considering now that a typical heat pump system with a capacity in the 2–5 ton range will have a maximum operating pressure in its vapor line of 460–520 Psig, it will be recognized that the ASME maximum working pressure will be exceeded unless some means, such as the present invention, is applied to limit the pressure.

Referring now to the last two columns of Table I, the pressure switch cut-in and cut-out pressures are provided for each of the pressure switches that are applied to the systems of the capacities listed. For example, in a two ton system, wherein the ASME working pressure is 472 Psig, the vapor pressure switch 33 will cut out (i.e. it will open to turn off the fan motor 22) at 400 Psig and will remain open until the pressure has dropped to 325 Psig, at which time it will then close and resume operation.

The "cutout pressure" may therefore have a greater safety factor than the ASME maximum working pressure and is therefore equal to or less than the ASME maximum working pressure as is herein defined as a "predetermined maximum threshold pressure limit" which is chosen for the system. As seen in Table I, this may be set at the same level as the ASME maximum working pressure (eg. for the 2.5–3 and 4–5 ton systems), which may also be considered as the predetermined maximum design pressure, or it may be established at a lower pressure (eg. for the 2 ton and the 3.5–4 ton systems).

Figure 3:
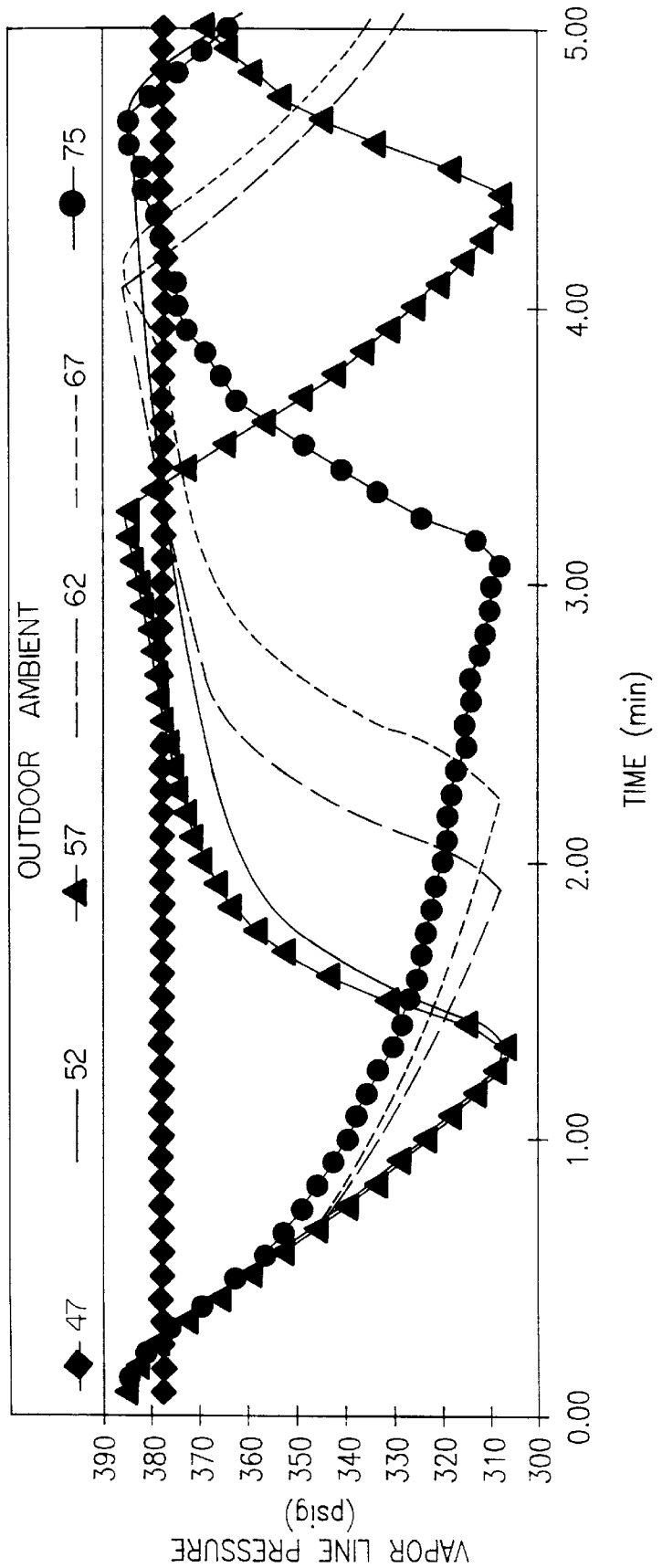
FIG. 3 is a graphic illustration of the outdoor fan cycle rate as a function of ambient temperature.

As the ambient temperature rises to the point that the cut-out pressure is reached, the present invention will be operative. When the temperature is above 50° F., the cycle rate is relatively short, whereas, as the temperature increases, the cycle rate will decrease. This is illustrated in FIG. 3 wherein actual test data is presented. In operation, the fan is deenergized at the highest point and energized at the lowest point on each curve. Cycling of the outdoor fan will have minimal impact on performance due to low building loads at higher ambients.

While the present invention has been disclosed with particular reference to a preferred embodiment, the concepts of this invention are readily adaptable to other embodiments, and those skilled in the art may vary the structure thereof without departing from the essential spirit of the invention.

What is claimed is:

1. In a heat pump system having a compressor, outdoor and indoor fans, outdoor and indoor coils interconnected by liquid and vapor lines, and a reversing valve operable to selectively direct refrigerant flow for either cooling or heating modes of operation, a control system for allowing the use of a replacement refrigerant having a substantially higher pressure than the refrigerant for which the system was designed, without replacement of the lines in the indoor coil or the vapor line, comprising:

means for sensing when the pressure in the vapor line exceeds a predetermined maximum threshold pressure limit for said vapor line during periods of operation in the heat pump mode; and means for responsively reducing the speed of the outdoor fan to thereby lower the pressure to an acceptable limit below said predetermined pressure limit.

2. A heat pump system as set forth in claim 1 wherein said pressure sensing means is a pressure switch located in an outdoor unit in the system.

3. A heat pump system as set forth in claim 2 wherein said pressure switch is a normally closed switch in series with a drive motor of said outdoor fan.

4. A heat pump system as set forth in claim 3 wherein said pressure switch is designed to open at a first predetermined pressure level and to close at a second predetermined pressure level below that of said first predetermined pressure level.

5. A heat pump system as set forth in claim 1 wherein said speed reducing means is a switch that turns off the outdoor fan.

6. In a heat pump system having a outdoor unit with a compressor, a fan, and a heat exchanger coil, and an indoor unit connected thereto by liquid and vapor tubes, a control system for limiting the pressure in said vapor line during periods of heat pump operation comprising:

a vapor pressure switch with a pressure sensing portion operatively connected in the outdoor unit for sensing the pressure in the vapor line, and with an electrical portion operatively connected in series with a motor of the fan; and wherein when said pressure switch portion operates to sense a predetermined maximum threshold pressure limit for the vapor line of and causes said switch portion to reduce the speed of the fan and thereby reduce the pressure in the vapor line.

7. A heat pump as set forth in claim 6 wherein said vapor pressure switch is a normally closed switch.

8. A heat pump as set forth in claim 7 wherein said vapor pressure switch is designed to open at a first predetermined pressure level and to close at a second predetermined pressure level below that of said first predetermined pressure level.

9. A heat pump system as set forth in claim 6 wherein said switch portion turns off the outdoor fan.

10. In a heat pump of the type having a compressor, outdoor and indoor fans, outdoor and indoor coils interconnected by respective liquid and vapor interconnect tubes, wherein the pressure in at least one of said tubes is susceptible to exceeding a predetermined maximum threshold pressure limit during periods of operation in the heating mode, a method of controlling the pressure in said tubes comprising the steps:

sensing the pressure in said vapor line;

comparing said sensed pressure with said predetermined maximum threshold pressure limit which is indicative of a safe pressure limit for said vapor line; and when said sensed pressure is equal to said maximum threshold pressure limit, reducing the speed of the outdoor fan so as to lower the pressure in said tubes.

11. A method as set forth in claim 10 and including the additional step of, when said sensed pressure has been reduced to a minimum threshold pressure, increasing the speed of the outdoor fan so as to raise the pressure in said tubes.

12. A method as set forth in claim 10 wherein said step of reducing the speed of the outdoor fan is accomplished by turning off the electrical power thereto.

13. A method as set forth in claim 11 wherein said step of increasing the speed of the outdoor fan is accomplished by resuming the electrical power thereto.

* * * * *